(12) United States Patent
Chang et al.

(10) Patent No.: US 10,083,384 B2
(45) Date of Patent: Sep. 25, 2018

(54) DISPLAY DEVICE FOR DISPLAYING BARCODE

(71) Applicants: AROLLTECH CO., LTD., Grand Cayman (KY); Yu-Chih Jen, Taipei (TW)

(72) Inventors: Yih Chang, New Taipei (TW); Yu-Chih Jen, Taipei (TW)

(73) Assignee: AROLLTECH CO., LTD., Grand Cayman (KY)

( * ) Notice: Subject to any disclaimer, the term of this patent is extended or adjusted under 35 U.S.C. 154(b) by 93 days.

(21) Appl. No.: 15/158,286

(22) Filed: May 18, 2016

(65) Prior Publication Data
US 2017/0337456 A1 Nov. 23, 2017

(51) Int. Cl.
| | |
|---|---|
| *G06K 19/06* | (2006.01) |
| *G06T 3/40* | (2006.01) |
| *G06F 3/0346* | (2013.01) |
| *G09G 5/00* | (2006.01) |
| *G06T 3/60* | (2006.01) |
| *G09G 3/3208* | (2016.01) |
| *G09G 3/36* | (2006.01) |
| *G06T 1/00* | (2006.01) |
| *G06F 21/32* | (2013.01) |
| *G06K 7/10* | (2006.01) |

(52) U.S. Cl.
CPC ..... *G06K 19/06028* (2013.01); *G06F 3/0346* (2013.01); *G06F 21/32* (2013.01); *G06K 19/06112* (2013.01); *G06T 1/00* (2013.01); *G06T 3/40* (2013.01); *G06T 3/60* (2013.01); *G09G 3/3208* (2013.01); *G09G 3/36* (2013.01); *G09G 5/005* (2013.01); *G06K 7/1095* (2013.01); *G09G 2370/02* (2013.01); *G09G 2370/042* (2013.01)

(58) Field of Classification Search
CPC ....... G06K 19/06028; G06K 19/06112; G06K 7/1095; G09G 3/3208; G09G 3/36; G09G 5/005; G09G 2370/042; G09G 2370/02; G06T 3/60; G06T 3/40; G06T 1/00; G06F 21/32; G06F 3/0346
See application file for complete search history.

(56) References Cited

U.S. PATENT DOCUMENTS

| | | | | |
|---|---|---|---|---|
| 5,545,887 A | * | 8/1996 | Smith ................ | G06K 7/10851 235/462.08 |
| 6,685,093 B2 | | 2/2004 | Challa et al. | |

(Continued)

OTHER PUBLICATIONS

Furong Zhu, Ong Kian Soo, Tan Li Wei, Hao Xiaotao, and Liew Pooi Kwan, "High-Contrast OLEDs", 2005 IEEE LEOS Annual Meeting Conference Proceedings, Oct. 22-28, 2005. p. 589-590, ISSN: 1092-8081, IEEE, Sydney, NSW.

(Continued)

*Primary Examiner* — Maurice L McDowell, Jr.
(74) *Attorney, Agent, or Firm* — Muncy, Geissler, Olds & Lowe PC

(57) ABSTRACT

A display device includes a screen. The screen is arranged to display a modifying barcode having a plurality of modifying parallel bars. The screen has a pixel direction and a sub-pixel direction different from the pixel direction. The plurality of modifying parallel bars of the modifying barcode are perpendicular or substantially perpendicular to the pixel direction.

19 Claims, 12 Drawing Sheets

(56) References Cited

U.S. PATENT DOCUMENTS

| | | |
|---|---|---|
| 8,794,529 B2 | 8/2014 | Osborne et al. |
| 8,862,513 B2 | 10/2014 | Wong |
| 8,881,984 B2 | 11/2014 | Santos et al. |
| 2004/0076310 A1* | 4/2004 | Hersch ................ B42D 25/342 382/100 |
| 2005/0092840 A1* | 5/2005 | Schuessler ....... G06K 19/06028 235/462.16 |
| 2010/0149187 A1* | 6/2010 | Slavin ..................... G06K 1/12 345/441 |
| 2013/0153662 A1 | 6/2013 | Prakash |
| 2014/0054381 A1 | 2/2014 | Cha et al. |
| 2014/0184471 A1* | 7/2014 | Martynov ............. G06F 3/1423 345/1.2 |

OTHER PUBLICATIONS

Emin Gabrielyan, "The Basics of Line Moiré Patterns and Optical Speedup", Switzernet Sarl, Scientific Park of Swiss Federal Institute of Technology, Lausanne (EPFL) pp. 1-9, 2007.

Clement Creusot and Asim Munawar, "Real-time Barcode Detection in the Wild", 2015 IEEE Winter Conference on Applications of Computer Vision, Jan. 5-9, 2015, p. 239-245, ISSN: 1550-5790, IEEE, Waikoloa, HI.

\* cited by examiner

DISPLAY DEVICE FOR DISPLAYING BARCODE

TECHNICAL FIELD

The present disclosure relates to a display device and a barcode displaying method thereof, and more particularly to a display device for displaying a barcode readable for a barcode laser scanner, 1D imager barcode reader, 2D imager barcode reader, and/or 3D imager barcode reader, and method thereof.

DISCUSSION OF THE BACKGROUND

A barcode is an optical machine-readable representation of data. Traditionally, the barcode is printed on paper, metal can, and various materials such that a barcode laser scanner can read the barcode by receiving the reflected light of the barcode and transforming to the electronic signals to read. For the barcode linear (e.g. 1D) and 2D imagers, they emit the light and use the photo sensor inside the imagers to recognize the contrast and image process to decode the barcode information. However, when the barcode is presented on a display of an electronic device, the barcode scanner may not correctly decode the data of the barcode if the barcode scanner directly scans the barcode on the screen. For example, when the barcode is presented on a liquid crystal display (LCD), the contrast ratio between the displayed bars and spaces of the barcode may not sufficiently be detected by the barcode scanner because either the reflectivity from the LCD display may be too low to render a readable barcode or the interference caused by Moire effect if the standard barcode dimensions are used. Therefore, there is a need to provide a novel method for displaying a barcode on an electronic display such that a barcode reader can correctly and reliably scan or image and decode the barcode because the coming e-payment in e-commerce becomes more popular for the consumers to rely on using the barcode for all the transaction in mobile devices.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

According to an embodiment, a display device is disclosed. The display device comprises a screen. The screen is arranged to display a modifying barcode having a plurality of modifying parallel bars. The screen has a pixel direction and a sub-pixel direction different from the pixel direction, and the plurality of modifying parallel bars of the modifying barcode are perpendicular or substantially perpendicular to the pixel direction.

The foregoing outlines features of several embodiments so that those skilled in the art may better understand the aspects of the present disclosure. Other technical features and advantages constituting claims of the present disclosure are described in the following descriptions. Those skilled in the art should appreciate that they may readily use the present disclosure as a basis for designing or modifying other processes and structures for carrying out the same purposes of the embodiments introduced herein. Those skilled in the art should also realize that such equivalent constructions do not depart from the spirit and scope of the present disclosure, and that they may make various changes, substitutions.

BRIEF DESCRIPTION OF THE DRAWINGS

Aspects of the present disclosure are best understood from the following detailed description when read with the accompanying figures. Please note that in accordance with the standard practice in the industry, various features are not drawn to scale. In fact, the dimensions of the various features may be arbitrarily increased or reduced for clarity of discussion.

DETAILED DESCRIPTION

Figure 1:
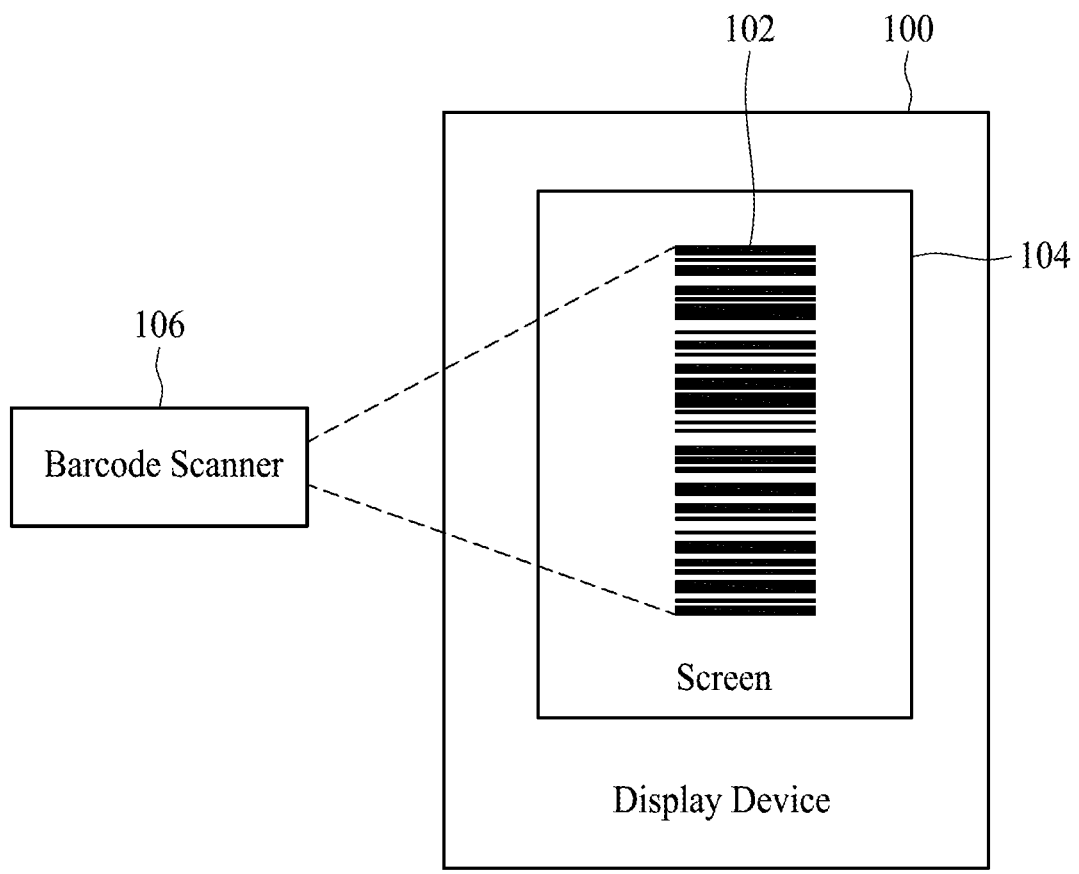
FIG. 1 is a diagram illustrating a display device of an electronic device in accordance with an embodiment of the present disclosure.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a diagram illustrating a display device 100 of an electronic device in accordance with an embodiment of the present disclosure. According to the embodiment, the display device 100 is capable of displaying a barcode 102 on a screen 104 that is readable for a barcode scanner (or reader) 106. Specifically, the barcode 102 may be a one-dimensional (1D) barcode. For example, the barcode may be a Code 39 (1D) barcode, Code 128 barcode, International Article Number (EAN) 13 barcode, EAN 8 barcode, and so on. However, this is not a limitation of the present invention. The barcode 102 may also be a two-dimensional (2D), a quick response (QR) barcode or any other type of barcodes. In addition, the barcode scanner 106 is arranged to perform the operation of emitting light to the screen 104 and receiving the reflected light from the screen 104 for reading the barcode 102. Therefore, any optical device capable of performing the above operation belongs to the barcode scanner 106. For example, the barcode scanner 106 may be a barcode laser scanner, a 1D imager barcode reader, a 2D imager barcode reader, a 3D imager barcode reader, digital camera in mobile phones, or any other type of readers which read and decode the barcode information. Accordingly, the barcode scanner 106 can be any electronic device capable of performing the barcode recognition via the process of scanning or photographing and/or the translation by decoding and demonstration of the barcode. Moreover, the barcode 102 may be used for transactions. However, this is not a limitation of the present disclosure. The barcode 102 may also represent ID cards, VIP cards, coupons, tickets, security keys and so on.

Figure 2:
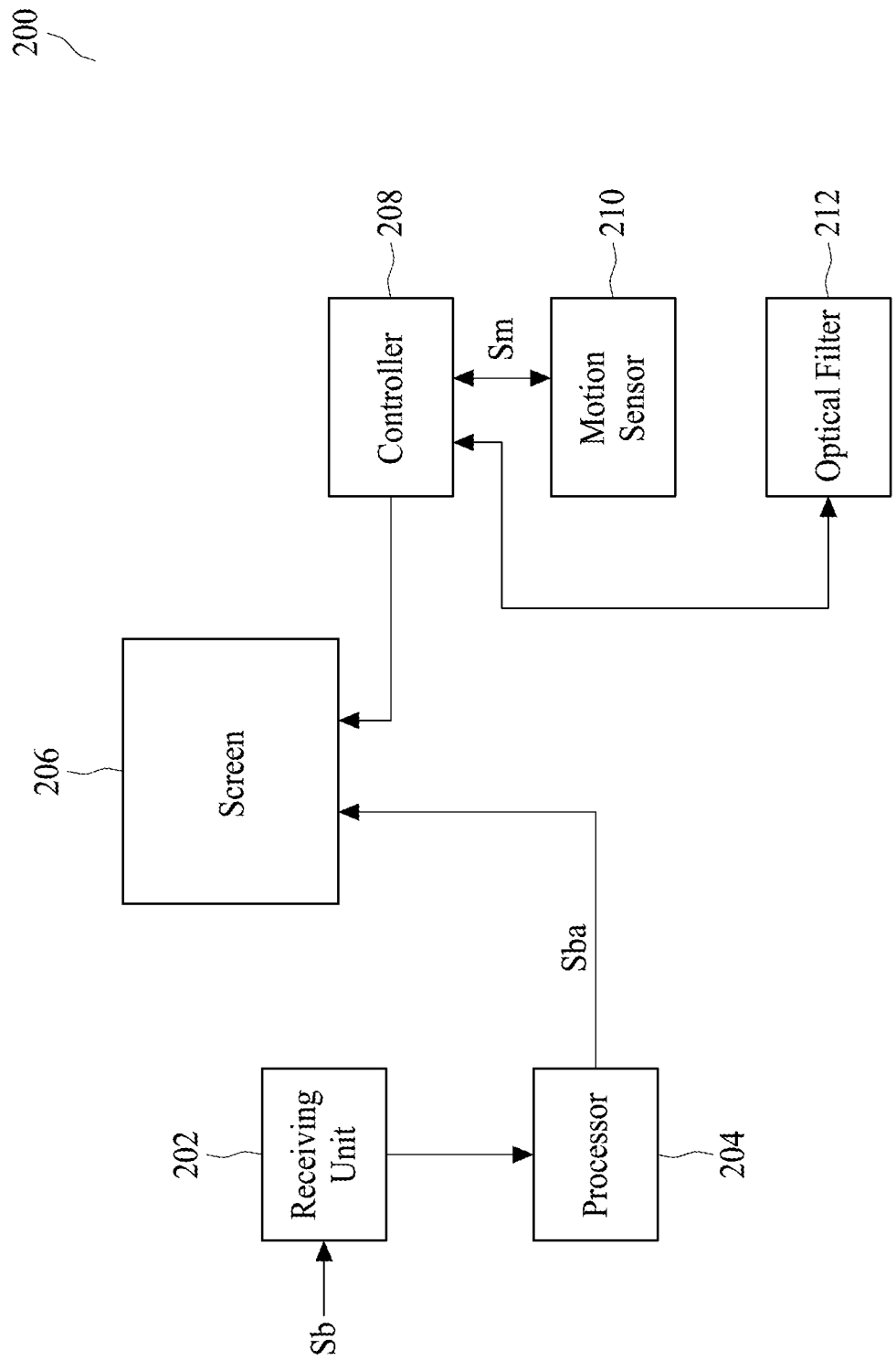
FIG. 2 is a block diagram illustrating a display device in accordance with an embodiment of the present disclosure.

FIG. 2 is a block diagram illustrating a display device 200 in accordance with an embodiment of the present disclosure. The display device 200 is similar to the display device 100 in FIG. 1. The display device 200 comprises a receiving unit 202, a processor 204, a screen 206, a controller 208, a motion sensor 210, and an optical filter 212. It is noted that the receiving unit 202, the processor 204, the controller 208, and the motion sensor 210 may be integrated into a single chip. The block diagram of FIG. 2 is simply used for describing the feature of the display device 200, and is not a limitation of the present disclosure. The receiving unit 202 is arranged to receive a barcode Sb. When the barcode Sb is a 1D barcode, the barcode Sb is characterized by a plurality of parallel bars. In short, the barcode Sb comprises a plurality of parallel bars. The processor 204 is arranged to determine a pixel direction and a sub-pixel direction of the display device 200, wherein the pixel direction is different from the sub-pixel direction, and the processor 204 further rotates the barcode Sb for generating a modifying barcode Sba such that a plurality of modifying parallel bars of the modifying barcode Sba are perpendicular or substantially perpendicular to the pixel direction. It is noted that, designing the plurality of modifying parallel bars to be perpendicular to the pixel direction is the preferred mode of the present disclosure. The display device 200 may still have the similar effect if the plurality of modifying parallel bars are slightly shifted from the position of perpendicular to the pixel direction. Moreover, the processor 204 further adjusts a size of the modifying barcode Sba such that a Moire fringe period caused by at least one of the modifying barcode Sba, the barcode scanner 106, and the screen 206 is larger than a threshold period. The screen 206 is arranged to display the modifying barcode Sba. The controller 208 is arranged to lock the screen 206 such that the modifying barcode Sba displayed on the screen 206 does not move according to a movement of the display device 200.

The detailed operation of the display device 200 is described in the following paragraphs.

Figure 3:
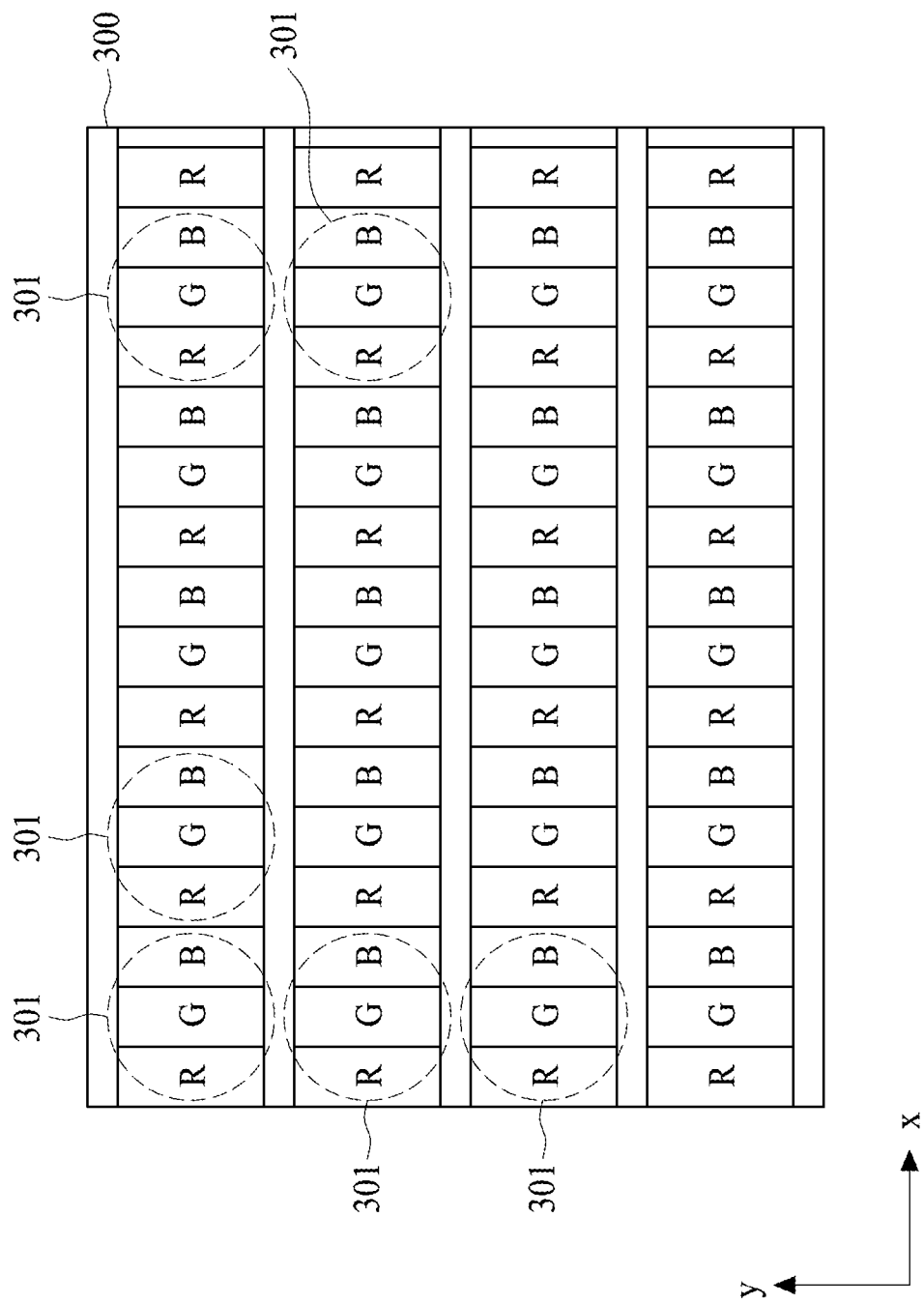
FIG. 3 is a diagram illustrating an enlarged layout of a screen of a display device in accordance with an embodiment of the present disclosure.

According to the embodiment, the display device 200 is a liquid crystal display (LCD). However, this is not a limitation of the present embodiment. The display device 200 may also be an active-matrix organic light-emitting diode (AMOLED) display in another embodiment. FIG. 3 is a diagram illustrating an enlarged layout 300 of the screen 206 of the display device 200 in accordance with an embodiment of the present disclosure. As the display device 200 is an LCD, FIG. 3 clearly shows that the enlarged layout 300 of the screen 206 comprises a plurality of pixels 301 arranged in matrix form. Each pixel of the plurality of pixels 301 comprises three sub-pixels R, G, B, wherein R is the sub-pixel of red, G is the sub-pixel of green, and B is the sub-pixel of blue. It is noted that, for brevity, only a few pixels are labeled as 301 in FIG. 3. For a LCD, the plurality of pixels 301 is arranged in a vertical direction, and the sub-pixels R, G, B of each pixel 301 are arranged in a horizontal direction. Therefore, the pixel direction of the screen 206 is aligned with a y-axis and the sub-pixel direction of the screen 206 is aligned with an x-axis of FIG. 3. Accordingly, the spatial frequency in the y-axis of the screen 206 is lower than the spatial frequency in the x-axis of the screen 206. For example, the spatial frequency in the y-axis may be one-third of the spatial frequency in the x-axis.

Accordingly, when the display device 200 receives the barcode Sb via the receiving unit 202, the processor 204 is first to determine the pixel direction and the sub-pixel direction of the screen 206. Then, the processor 204 rotates the barcode Sb to make the plurality of modifying parallel bars of the modifying barcode Sba perpendicular or substantially perpendicular to the pixel direction. It is noted that the information of the pixel direction and the sub-pixel direction of the screen 206 may be pre-stored in the display device 200, and the processor 204 simply reads the information when the barcode Sb is received.

Figure 4:
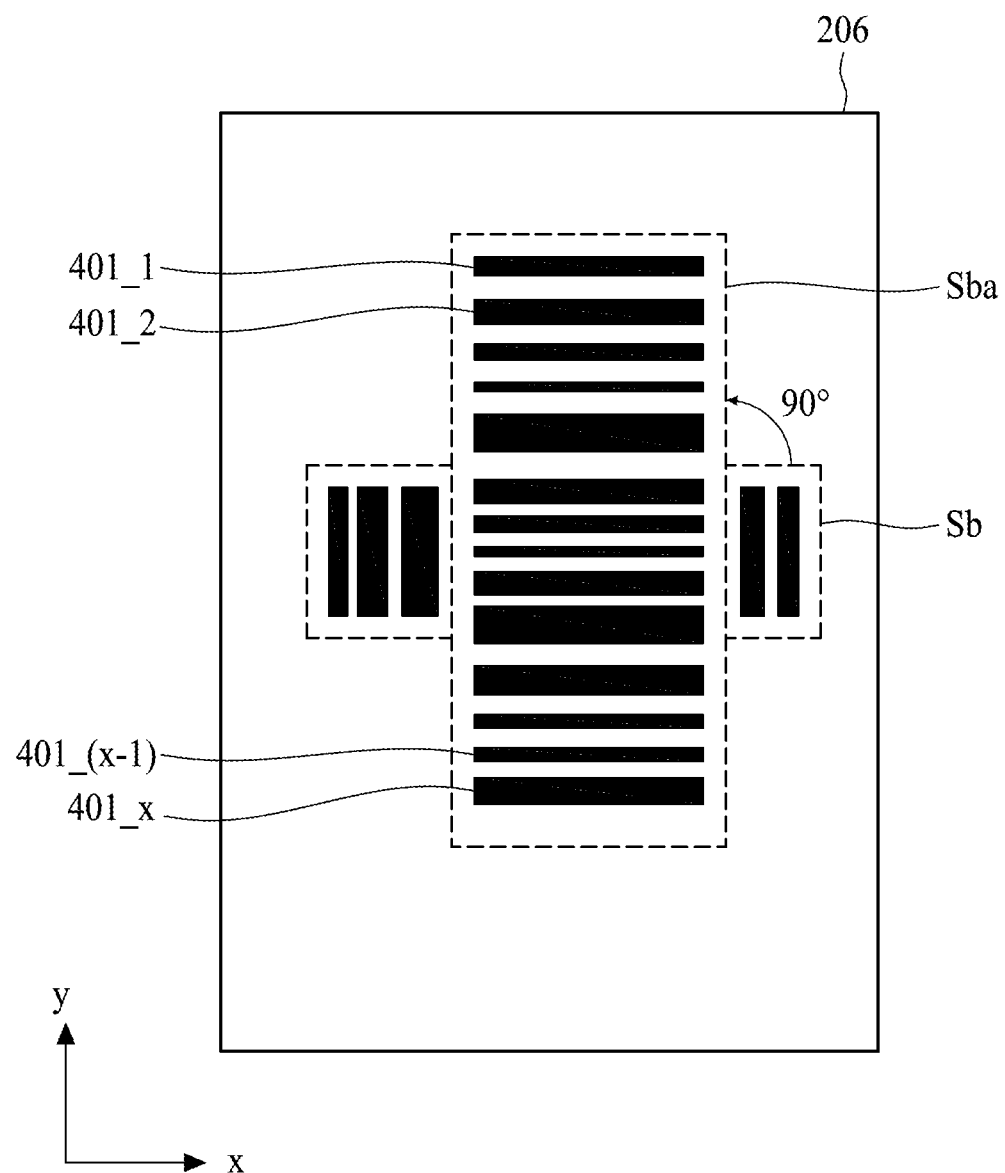
FIG. 4 is a diagram illustrating a screen displaying a barcode and a modifying barcode in accordance with an embodiment of the present disclosure.

FIG. 4 is a diagram illustrating the screen 206 displaying the barcode Sb and the modifying barcode Sba in accordance with an embodiment of the present disclosure. In FIG. 4, the barcode Sb is rotated by an angle of 90 degrees or substantially 90 degrees such that the plurality of modifying parallel bars (i.e. 401_1~401_x) of the modifying barcode Sba are perpendicular or substantially perpendicular to the pixel direction y. It is noted that, according to the embodiment, the barcode Sb is not necessarily shown on the screen 206. The screen 206 may only show the modifying barcode Sba. The screen 206 in FIG. 4 showing both of the barcode Sb and the modifying barcode Sba is simply for the purpose of description.

In addition, the processor 204 also adjusts the size of the modifying barcode Sba such that a Moire fringe period P caused by the modifying barcode Sba and the screen 206 is larger than a threshold period Tp. It is noted that the Moire effect is the effect of superimposing a repetitive design, such as a grid, on the same or a different design in order to produce a pattern distinct from its components. When the modifying barcode Sba has the plurality of modifying parallel bars 401_1~401_x displayed perpendicular or substantially perpendicular to the pixel direction y, i.e. parallel or superimpose to the sub-pixel direction x, of the screen 206, the Moire effect occurs. The Moire fringe period P is the distance of the periodically repeated dark parallel lines, also called moire lines. The detailed description of the Moire fringe effect is omitted here for brevity. However, there are three periodic patterns overlapped to generate different Moire fringes when a barcode reader to read a barcode on a screen. They are sub-pixel or pixel on a display, barcode itself, and image sensor inside the barcode reader or digital camera. The Moire fringe period P is the pitch generated from the overlapping three periodic patterns.

Figure 5:
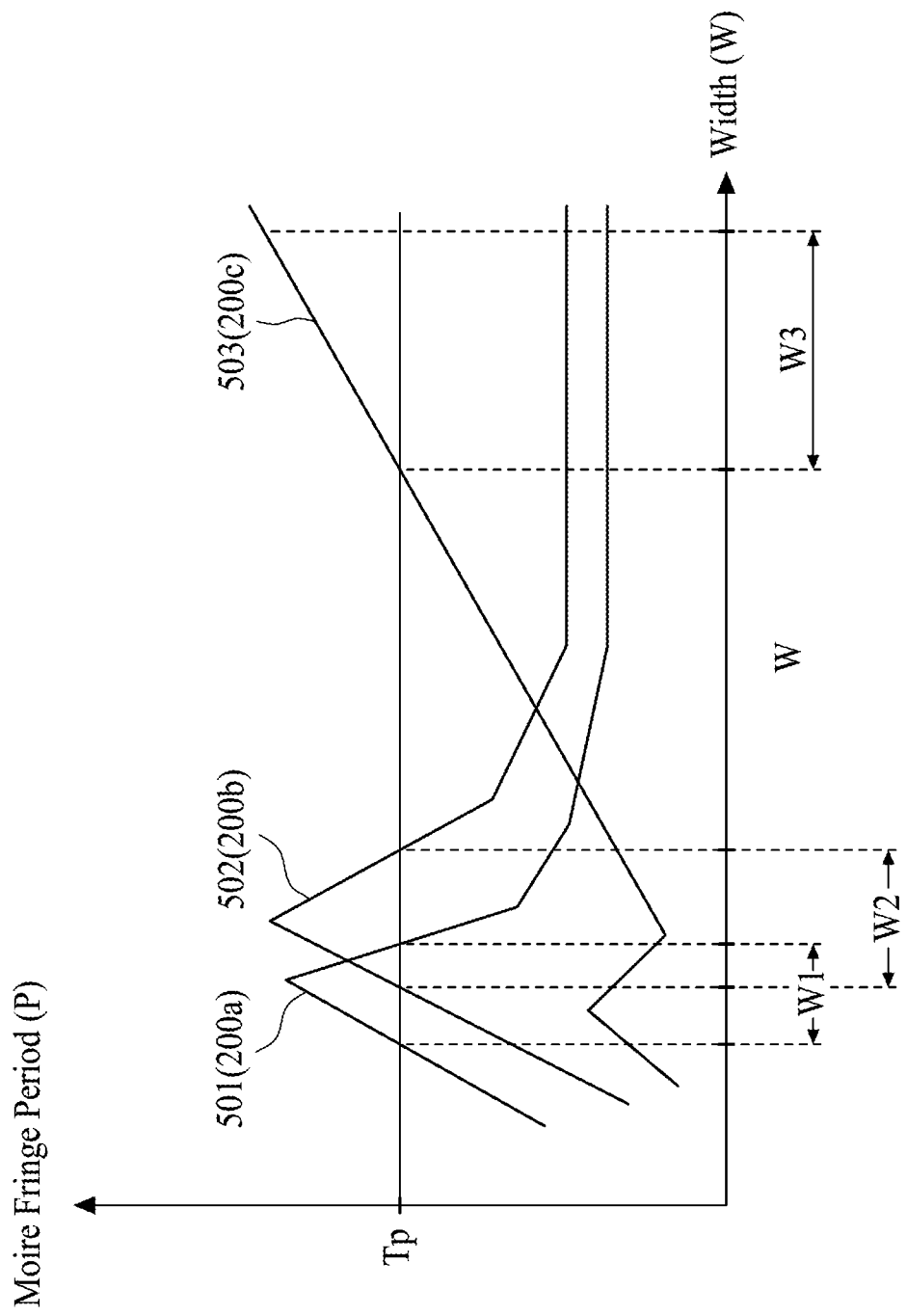
FIG. 5 is a diagram illustrating a relation between a width of the smallest modifying parallel bar in a plurality of modifying parallel bars and a Moire fringe period of three different display devices read by a specific barcode scanner resolution range in accordance with an embodiment of the present disclosure.

FIG. 5 is a diagram illustrating the relation between the width W of the smallest modifying parallel bar in the plurality of modifying parallel bars 401_1~401_x and the Moire fringe period P of three different display devices 200a, 200b, 200c read by a specific barcode scanner resolution range in accordance with an embodiment of the present disclosure. The curves 501(200a), 502(200b), 503(200c) correspond to the display devices 200a, 200b, 200c respectively. As shown in FIG. 5, the Moire fringe period P of the first display device 200a is larger than the threshold period Tp only when the width W of the smallest modifying parallel bar in the plurality of modifying parallel bars 401_1~401_x falls within the predetermined range W1. The Moire fringe period P of the second the display device 200b is larger than the threshold period Tp only when the width W of the smallest modifying parallel bar in the plurality of modifying parallel bars 401_1~401_x falls within the predetermined range W2. The Moire fringe period P of the third display device 200c is larger than the threshold period Tp only when the width W of the smallest modifying parallel bar in the plurality of modifying parallel bars 401_1~401_x falls within the predetermined range W3. Accordingly, different display devices may have different ranges of minimum width of parallel bars to make the Moire fringe period P larger than the threshold period Tp. According to the embodiment, when the Moire fringe period P is larger than the threshold period Tp, the barcode scanner 106 can correctly read/decode the data of the modifying barcode Sba by directly scanning or imaging the modifying barcode Sba on the screen 206. The threshold period Tp may be a predetermined value or a calculated value obtained by the processor 204. In addition, the information of FIG. 5 may be transformed into a look-up table and stored in the display device 200 for various types of displays and barcode readers.

Figure 6:
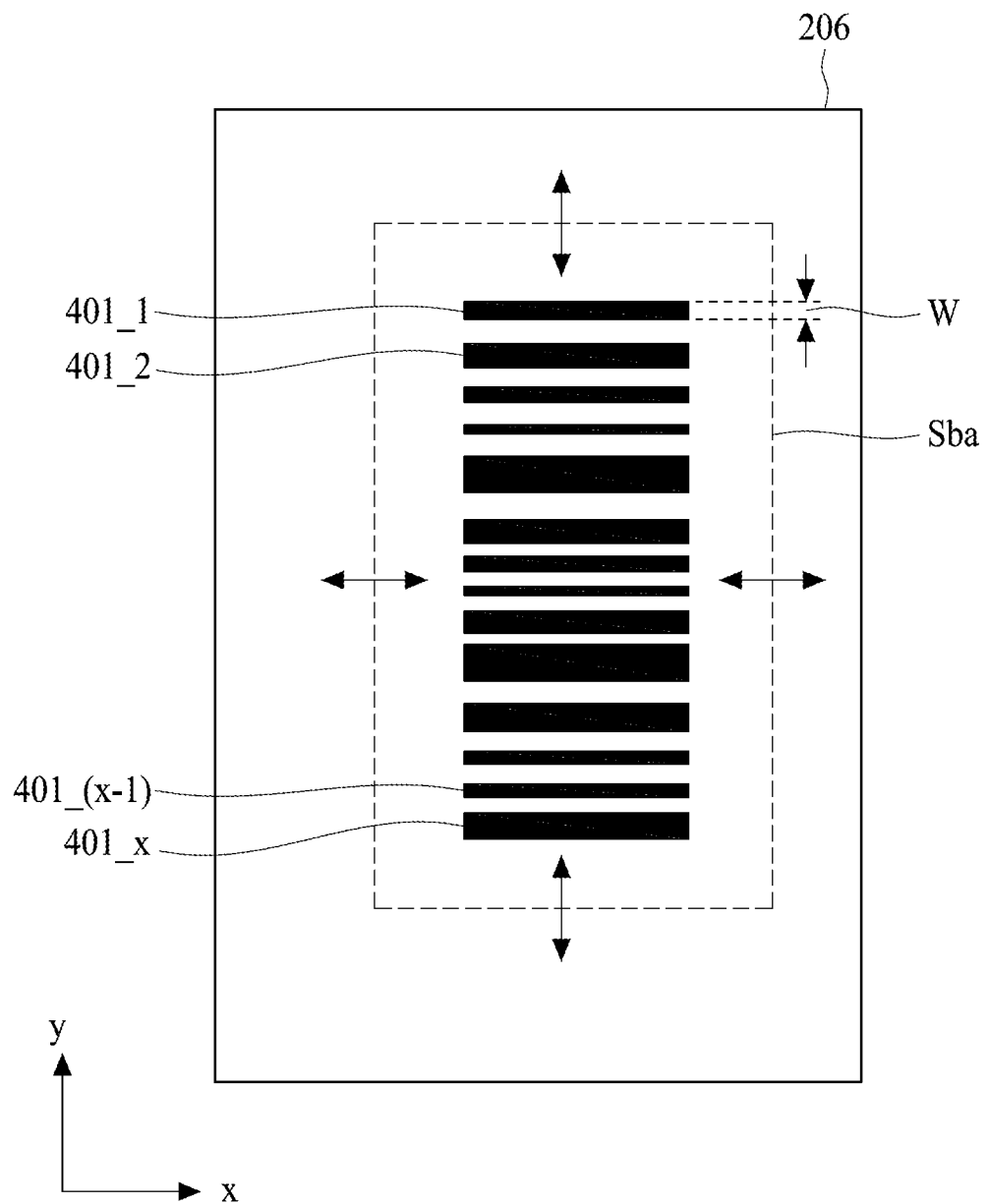
FIG. 6 is a diagram illustrating a modifying barcode after a size is adjusted by a processor in accordance with an embodiment of the present disclosure.

Accordingly, when the processor 204 determines the type of the display device 200, the processor 204 expands or shrinks the size of the modifying barcode Sba to make the Moire fringe period P larger than the threshold period Tp according to one of the curves of FIG. 5. FIG. 6 is a diagram illustrating the modifying barcode Sba after the size is adjusted by the processor 204 in accordance with an embodiment of the present disclosure. In FIG. 6, it is assumed that the smallest modifying parallel bar in the plurality of modifying parallel bars 401_1~401_x is the first modifying parallel bar 401_1, then the processor 204 scales the modifying barcode Sba to make the width W of the smallest modifying parallel bar 401_1 fall within a corresponding range, e.g. the predetermined range W1 if the type of display device 200 is the first display device 200a. It should be noted that, when the processor 204 scales the modifying barcode Sba, the widths of the plurality of modifying parallel bars 401_1~401_x and spaces of the plurality of modifying parallel bars 401_1~401_x are also adjusted accordingly.

It is also noted that, in another embodiment, the processor 204 may also adjust the widths of the plurality of modifying parallel bars 401_1~401_x and spaces of the plurality of modifying parallel bars 401_1~401_x such that a width of the smallest space in the spaces of the plurality of modifying parallel bars 401_1~401_x falls within a predetermined range. Here, the smallest space in the spaces of the plurality of modifying parallel bars 401_1~401_x is similar to the width of the smallest modifying parallel bar of the plurality of modifying parallel bars 401_1~401_x. Therefore, by referring to the curves of FIG. 5, when the width of the smallest space in the spaces of the plurality of modifying parallel bars 401_1~401_x falls within the predetermined range, the Moire fringe period P is larger than the threshold period Tp. As the scaling operation of the modifying barcode Sba of this embodiment is similar to the above-mentioned embodiment, the detailed description is omitted here for brevity.

Furthermore, the controller 208 of the display device 200 also locks the screen 206 such that the modifying barcode Sba displayed on the screen 206 does not move according to the movement of the display device 200. Then, the display device 200 can be moved to approach the barcode scanner 106 for directly scanning the modifying barcode Sba on the screen 206. According to the embodiment, the controller 208 may control the display device 200 to not respond to a motion signal Sm generated by the motion sensor 210 such that the modifying barcode Sba displayed on the screen 206 does not move according to the movement of the display device 200. It is noted that, in the display device 200, the motion sensor 210 is arranged to sense the movement of the display device 200 and accordingly generate the motion signal Sm.

Moreover, the controller 208 also turns off the optical filter 212 of the display device 200 such that the modifying barcode Sba displayed on the screen 206 does not undergo the pixel rendering process. It is noted that, in the display device 200, the optical filter 212 is arranged to perform the pixel rendering process during the normal image display process of the display device 200. The optical filter 212, however, is turned off during the barcode display process. The pixel rendering process may be a Fourier transformation operated upon the display image.

Figure 7:
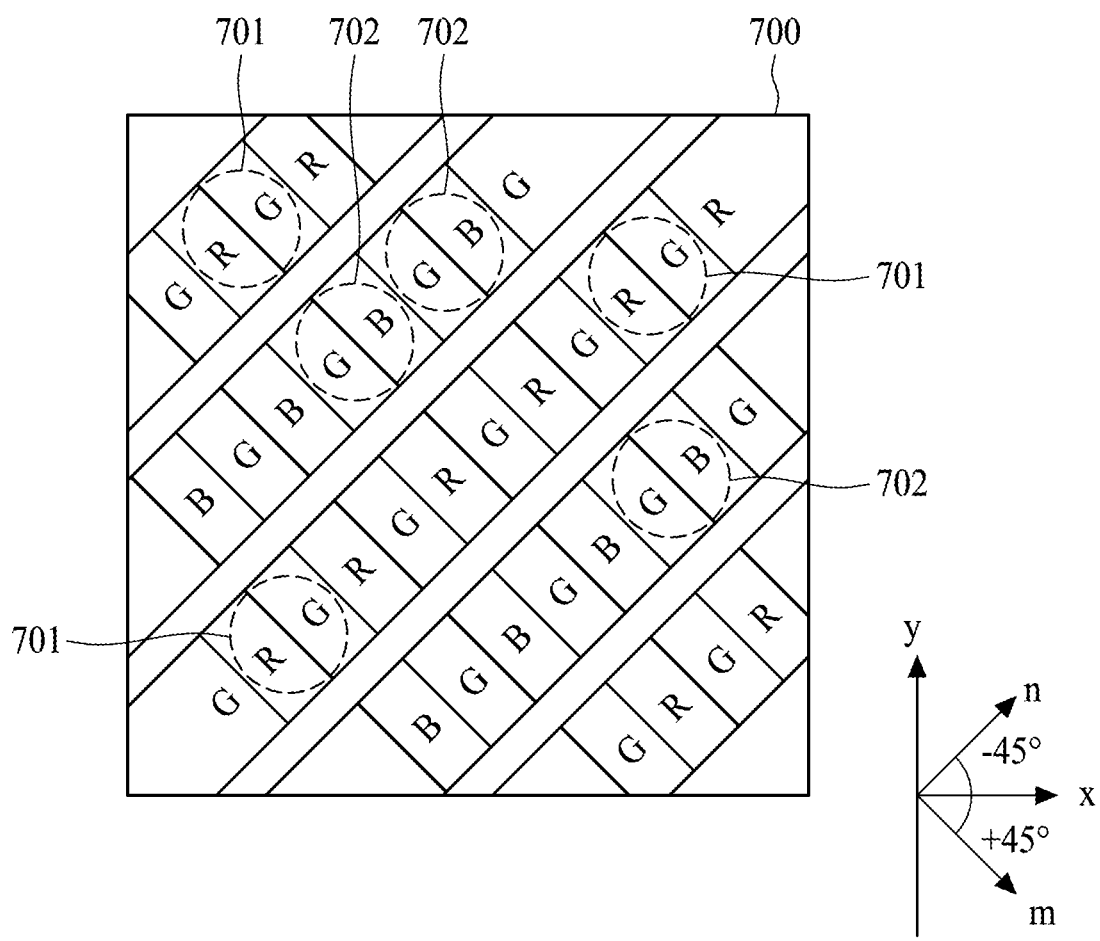
FIG. 7 is a diagram illustrating an enlarged layout of a screen of an AMOLED display in accordance with an embodiment of the present disclosure.
Figure 8:
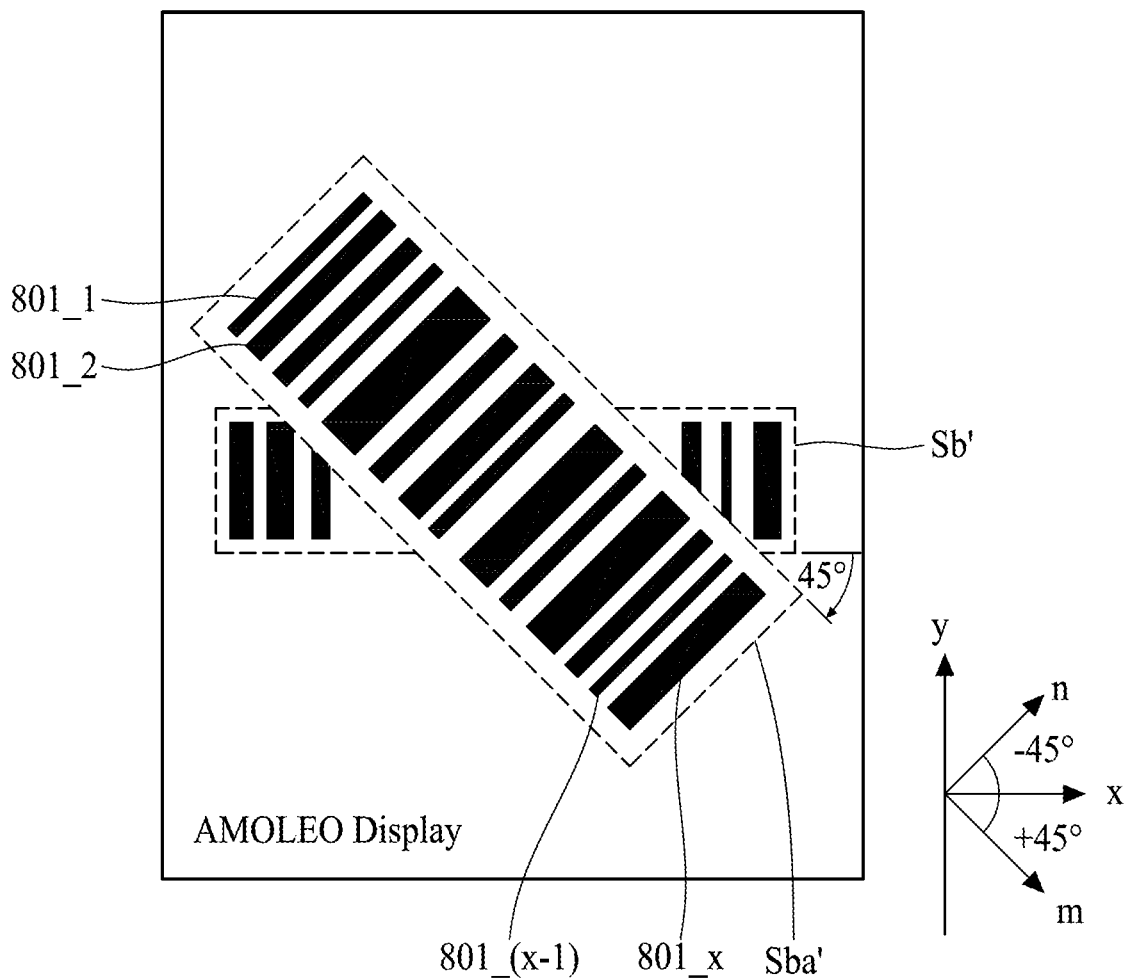
FIG. 8 is a diagram illustrating a screen displaying a barcode and a modifying barcode in accordance with a second embodiment of the present disclosure.

According to an embodiment of displaying the barcode Sb on the screen 206 of an LCD, the barcode Sb is rotated at an angle of 90 degrees or substantially 90 degrees such that the modifying barcode Sba is vertically displayed on the screen 206 as shown in FIG. 6. However, when the display device 200 is an active-matrix organic light-emitting diode (AMOLED) display with a Pentile pixel layout, the barcode Sb' is rotated at an angle of 45 degrees or substantially 45 degrees such that the modifying barcode Sba' is diagonally displayed on the screen of the AMOLED display as shown in FIG. 7 and FIG. 8. FIG. 7 is a diagram illustrating an enlarged layout 700 of a screen of an AMOLED display in accordance with an embodiment of the present disclosure. FIG. 8 is a diagram illustrating a screen 800 displaying a barcode Sb' and a modifying barcode Sba' in accordance with an embodiment of the present disclosure. FIG. 7 clearly shows that the enlarged layout 700 of the screen of the AMOLED display comprises a plurality of pixels arranged in a diagonal direction. The plurality of pixels are divided into two types of pixel. The first type of pixel (i.e. 701) comprises sub-pixels R, G, and the second type of pixel (i.e. 702) comprises sub-pixels G, B, wherein R is the sub-pixel of red, G is the sub-pixel of green, and B is the sub-pixel of blue. For an AMOLED display, the plurality of first type pixels 701 and the plurality of first type pixels 702 are alternatively permuted in the diagonal direction m. The sub-pixels R, G and G, B are arranged in the diagonal direction n, as shown in FIG. 7. Therefore, the pixel direction (i.e. m) of the screen 800 of the AMOLED display is +45 degrees biased from the x-axis, and the sub-pixel direction (i.e. n) of the screen 800 of the AMOLED display is −45 degrees biased from the x-axis. It is noted that the spatial frequency in the pixel direction m of the screen 800 is lower than the spatial frequency in the sub-pixel direction n of the screen 800.

Accordingly, when the AMOLED display receives the barcode Sb', the processor of the AMOLED display is first to determine the pixel direction m and the sub-pixel direction n of the screen 800. Then, the processor rotates the barcode Sb' to make the plurality of modifying parallel bars of the modifying barcode Sba' perpendicular or substantially perpendicular to the pixel direction in. It is noted that the information of the pixel direction m and the sub-pixel direction n of the screen 800 may be pre-stored in the AMOLED display, and the processor may simply read the information when the barcode Sb' is received. As shown in FIG. 8, the barcode Sb' is rotated by an angle of 45 degrees or substantially 90 degrees such that the plurality of modifying parallel bars (i.e. 801_1~801_x) of the modifying barcode Sba' are perpendicular or substantially perpendicular to the pixel direction m. It is noted that, according to the embodiment, the barcode Sb' is not necessarily shown on the screen 800. The screen 800 may only show the modifying barcode Sba'. The screen 800 in FIG. 8, showing both of the barcode Sb' and the modifying barcode Sba', is simply for the purpose of description.

Similar to the above embodiment of the LCD, the processor of the AMOLED display also adjusts the size of the modifying barcode Sba' such that the Moire fringe period caused by the modifying barcode Sba' and the screen 800 is larger than a threshold period. The controller of the AMOLED display also locks the screen 800 such that the modifying barcode Sba' displayed on the screen 800 does not move according to the movement of the AMOLED display. The controller of the AMOLED display also turns off the optical filter of the AMOLED display device such that the modifying barcode Sba' displayed on the screen 800 does not undergo the pixel rendering process. As the operation is similar to the operation of the above LCD, the detailed description is omitted here for brevity.

In addition, for the security issue, the processor 204 may perform an authentication process to obtain an authentication result, and the screen 206 is arranged to display the modifying barcode Sba (or Sba') if the authentication result indicates the authentication process is passed. The authentication process can be performed in any time before the modifying barcode Sba (or Sba') is displayed by the screen 206. Furthermore, the authentication process may be a password authentication process, an iris authentication process, a finger print authentication process, a finger vein authentication process, or any combinations of the above process.

According to the embodiment in FIG. 2, the barcode Sb is received from a processor, a device, a server, or a network external to the display device 100 via the receiving unit 202. However, this is not a limitation of the present invention. In another embodiment of the present invention, the barcode Sb may be generated in the display device 100, which means that the barcode Sb is internally generated by the display device 100. The barcode Sb may be generated by a locally software or an application software (APP) installed in the display device 100. In this embodiment, when a barcode (i.e. Sb) is to be displayed on the screen 206, the locally software will generate the barcode Sb. Then, the processor 204 performs the above-mentioned modification upon the internally generated barcode to generate the modifying barcode Sba. As the operation is similar to the above-mentioned operation, the detailed description is omitted here for brevity.

Moreover, in another embodiment of the present invention, the barcode Sb may also be a pre-stored barcode in a storage device (not shown) of the display device 100, or may be selected from a plurality of pre-stored barcodes in a storage device of the display device 100. In this embodiment, when the pre-stored barcode (i.e. Sb) is to be displayed on the screen 206, the processor 204 will take the pre-stored barcode from the storage device and perform the above-mentioned modification upon the pre-stored barcode to generate the modifying barcode Sba. The pre-stored barcode can be selected by the user or the processor 204. If the pre-stored barcode is pre-processed with the above-mentioned modification by the processor 204 before being stored, the processor 204 directly displays the selected pre-stored barcode. As the operation is similar to the above-mentioned operation, the detailed description is omitted here for brevity.

Figure 9:
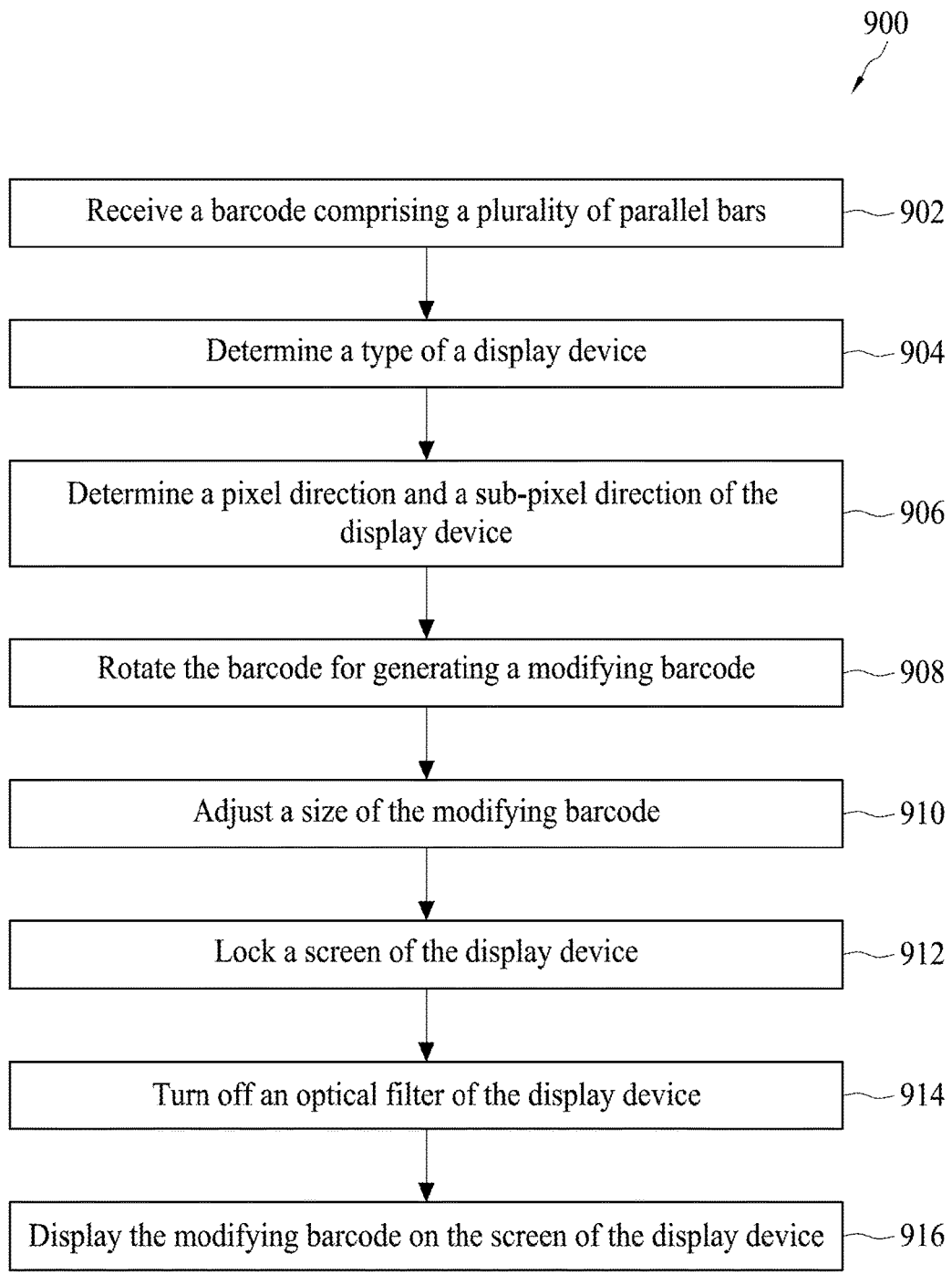
FIG. 9 is a flow diagram illustrating a barcode displaying method of a display device in accordance with an embodiment of the present disclosure.

Briefly, the above operation of displaying a barcode on an electronic screen such that a barcode scanner can directly scan the barcode on the electronic screen is summarized into the steps of FIG. 9. FIG. 9 is a flow diagram illustrating a barcode displaying method 900 of a display device in accordance with a first embodiment of the present disclosure. The barcode displaying method 900 can be implemented by the above mentioned display device 200 of FIG. 2. Thus, the barcode displaying method 900 is described in conjunction with the display device 200. However, this is not a limitation of the present disclosure. Provided that substantially the same result is achieved, the steps of the flow diagram shown in FIG. 9 do not need to be in the exact order shown and do not need to be contiguous, that is, other steps can be intermediate. The barcode displaying method 900 comprises:

Step 902: Receiving the barcode Sb comprising the plurality of parallel bars.

Step 904: Determining a type of the display device 200;

Step 906: Determining a pixel direction and a sub-pixel direction of the display device 200;

Step 908: Rotating the barcode Sb for generating the modifying barcode Sba such that the plurality of modifying parallel bars 401_1~401_x of the modifying barcode Sba are perpendicular or substantially perpendicular to the pixel direction;

Step 910: Adjusting a size of the modifying barcode Sba such that a Moire fringe period caused by the modifying barcode Sba and the screen 206 of the display device 200 is larger than the threshold period Tp;

Step 912: Locking the screen 206 of the display device 200 such that the modifying barcode Sba displayed on the screen 206 does not move according to a movement of the display device 200;

Step 914: Turning off the optical filter 212 of the display device 200 such that the modifying barcode Sba displayed on the screen 206 does not undergo the pixel rendering process;

Step 916: Displaying the modifying barcode Sba on the screen 206 of the display device 200.

It is noted that, for the security issue, the authentication process can be performed in any step (i.e. step 902, 904, 906, 908, 910, 912, or 914) before Step 916.

Moreover, according to the operation of the display device 200, the display device 200 receives a non-processed barcode (i.e. Sb), and then processes the non-processed barcode Sb in the display device 200 to generate the processed barcode (i.e. Sba). Therefore, the display device 200 can be regarded as a post-processed system because the whole modification (i.e. the barcode displaying method 900) is performed in the display device 200.

Figure 10:
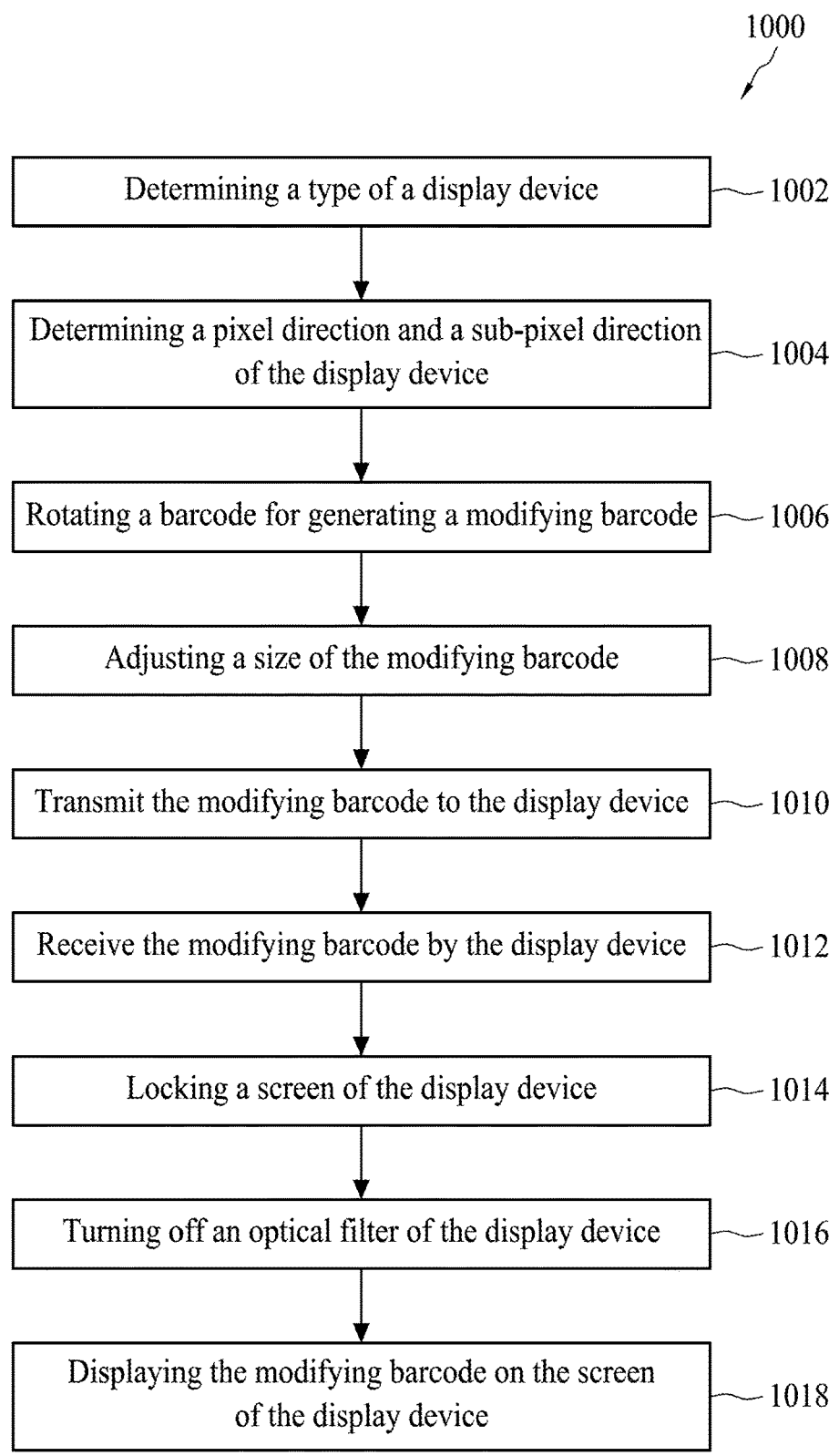
FIG. 10 is a flow diagram illustrating a barcode displaying method of a display device in accordance with a second embodiment of the present disclosure.

However, the modification is not necessary to be performed in the display device 200. The modifying barcode Sba may be generated by a system external to the display device 200. For example, the modifying barcode Sba may be generated in a network system, a software program, a mobile APP (application), a network server, or a website. Then, the modifying barcode Sba is transmitted to the display device 200. When the display device 200 receives the modifying barcode Sba, the display device 200 directly displays the modifying barcode Sba on the screen 206. FIG. 10 is a flow diagram illustrating a barcode displaying method 1000 of a display device in accordance with a second embodiment of the present disclosure. Provided that substantially the same result is achieved, the steps of the flow diagram shown in FIG. 10 do not need to be in the exact order shown and do not need to be contiguous, that is, other steps can be intermediate. The barcode displaying method 1000 comprises:

Step 1002: Determining a type of the display device 200;

Step 1004: Determining a pixel direction and a sub-pixel direction of the display device 200;

Step 1006: Rotating the barcode Sb for generating the modifying barcode Sba such that the plurality of modifying parallel bars 401_1-401_x of the modifying barcode Sba are perpendicular or substantially perpendicular to the pixel direction;

Step 1008: Adjusting a size of the modifying barcode Sba such that a Moire fringe period caused by the modifying barcode Sba and the screen 206 of the display device 200 is larger than the threshold period Tp;

Step 1010: Transmit the modifying barcode Sba to the display device 200;

Step 1012: Receive the modifying barcode Sba by the display device 200;

Step 1014: Locking the screen 206 of the display device 200 such that the modifying barcode Sba displayed on the screen 206 does not move according to a movement of the display device 200;

Step 1016: Turning off the optical filter 212 of the display device 200 such that the modifying barcode Sba displayed on the screen 206 does not undergo the pixel rendering process;

Step 1018: Displaying the modifying barcode Sba on the screen 206 of the display device 200.

According to the embodiment of barcode displaying method 1000, the operations of steps 1002, 1004, 1006, and 1008 are performed by a system external to the display device 200. The operation of step 1010 is performed by a wireless signal or a cable. The operations of steps 1012, 1014, 1016, and 1018 are performed by the display device 200.

It is noted that, for the security issue, the authentication process can be performed in the steps 1012, 1014, or 1016.

According to the above embodiment, the display device 200 is configured to generate the modifying barcode Sba according to the barcode Sb. However, this is not a limitation of the present invention.

In one embodiment, the modifying barcode Sba is generated on Internet or a processor external to the display device 200 according to the barcode Sb. In other words, the Internet or the processor pre-processes the barcode Sb to generate the modifying barcode Sba. Then, the modifying barcode Sba is transmitted to the display device 200 for displaying.

In another embodiment, the display device 200 only processes a partially processed barcode to generate the modifying barcode Sba, and the partially processed barcode is generated on Internet or a processor external to the display device 200 according to the barcode Sb. In other words, the Internet or the processor pre-processes the barcode Sb to generate the partially processed barcode. Then, the partially processed barcode is transmitted to the display device 200, and the display device 200 processes the partially processed barcode to generate the modifying barcode Sba. Therefore, the process of this embodiment is a hybrid process, and the partially processed barcode is an intermediate product between the barcode Sb and the modifying barcode Sba.

Figure 11:
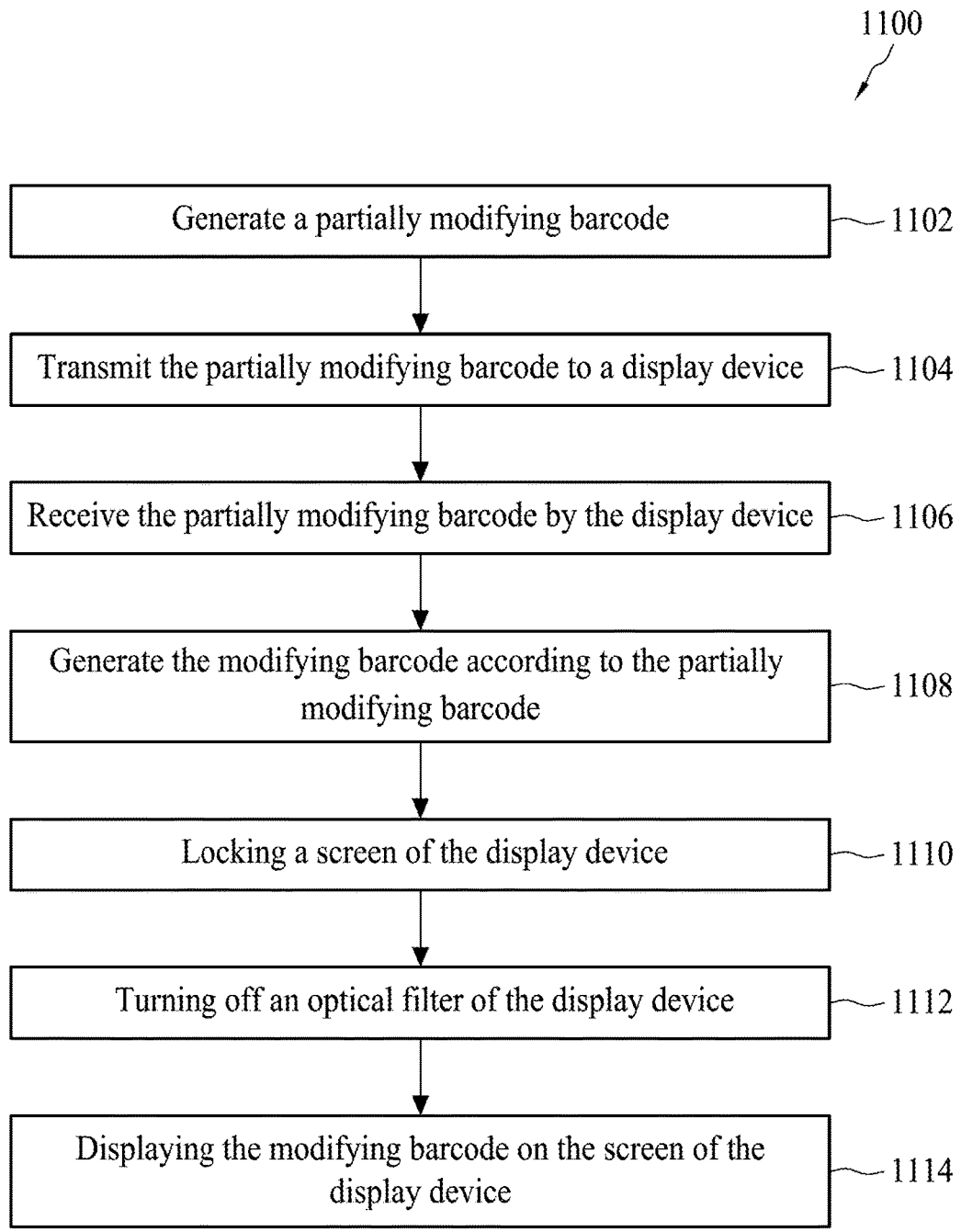
FIG. 11 is a flow diagram illustrating a barcode displaying method of a display device in accordance with a third embodiment of the present disclosure.

In the hybrid process, the processing of the barcode Sb to generate the modifying barcode Sba may be partially performed by a system, an Internet, or a processor external to the display device 200 and partially performed by the display device 200 itself. For example, a partially processed barcode may be generated in a network system, a software program, a mobile APP (application), a network server, or a website. Then, the partially processed barcode is transmitted to the display device 200, and the display device 200 generates the modifying barcode Sba according to the partially processed barcode. Then, the display device 200 displays the modifying barcode Sba on the screen 206. FIG. 11 is a flow diagram illustrating a barcode displaying method 1100 of a display device in accordance with a third embodiment of the present disclosure. Provided that substantially the same result is achieved, the steps of the flow diagram shown in FIG. 11 do not need to be in the exact order shown and do not need to be contiguous, that is, other steps can be intermediate. The barcode displaying method 1100 comprises:

Step 1102: Generate the partially processed barcode;

Step 1104: Transmit the partially processed barcode to the display device 200;

Step 1106: Receive the partially processed barcode by the display device 200;

Step 1108: Generate the modifying barcode Sba according to the partially processed barcode;

Step 1110: Locking the screen 206 of the display device 200 such that the modifying barcode Sba displayed on the screen 206 does not move according to a movement of the display device 200;

Step 1112: Turning off the optical filter 212 of the display device 200 such that the modifying barcode Sba displayed on the screen 206 does not undergo the pixel rendering process;

Step 1114: Displaying the modifying barcode Sba on the screen 206 of the display device 200.

According to the embodiment of barcode displaying method 1000, the operations of step 1102 is performed by a system external to the display device 200. The operation of step 1104 is performed by a wireless signal or a cable. The operations of steps 1106, 1108, 1110, 1112, and 1114 are performed by the display device 200.

Specifically, the external system may perform one or more of the steps 904, 906, 908, 910 upon a non-processed barcode (i.e. Sb) to generate the partially processed barcode. Then, the display device 200 performs the remaining step(s) upon the partially processed barcode to generate the modifying barcode Sba. For example, if the external system performs the step 904 upon the barcode Sb to generate the partially processed barcode in step 1102, then the display device 200 performs the steps 906, 908, and 910 to generate the modifying barcode Sba in step 1108. For another example, if the external system performs the steps 904 and 906 upon the barcode Sb to generate the partially processed barcode in step 1102, then the display device 200 performs the steps 908 and 910 to generate the modifying barcode Sba in step 1108.

It is noted that, for the security issue, the authentication process can be performed in the steps 1106, 1108, 1110, or 1112.

Figure 12:
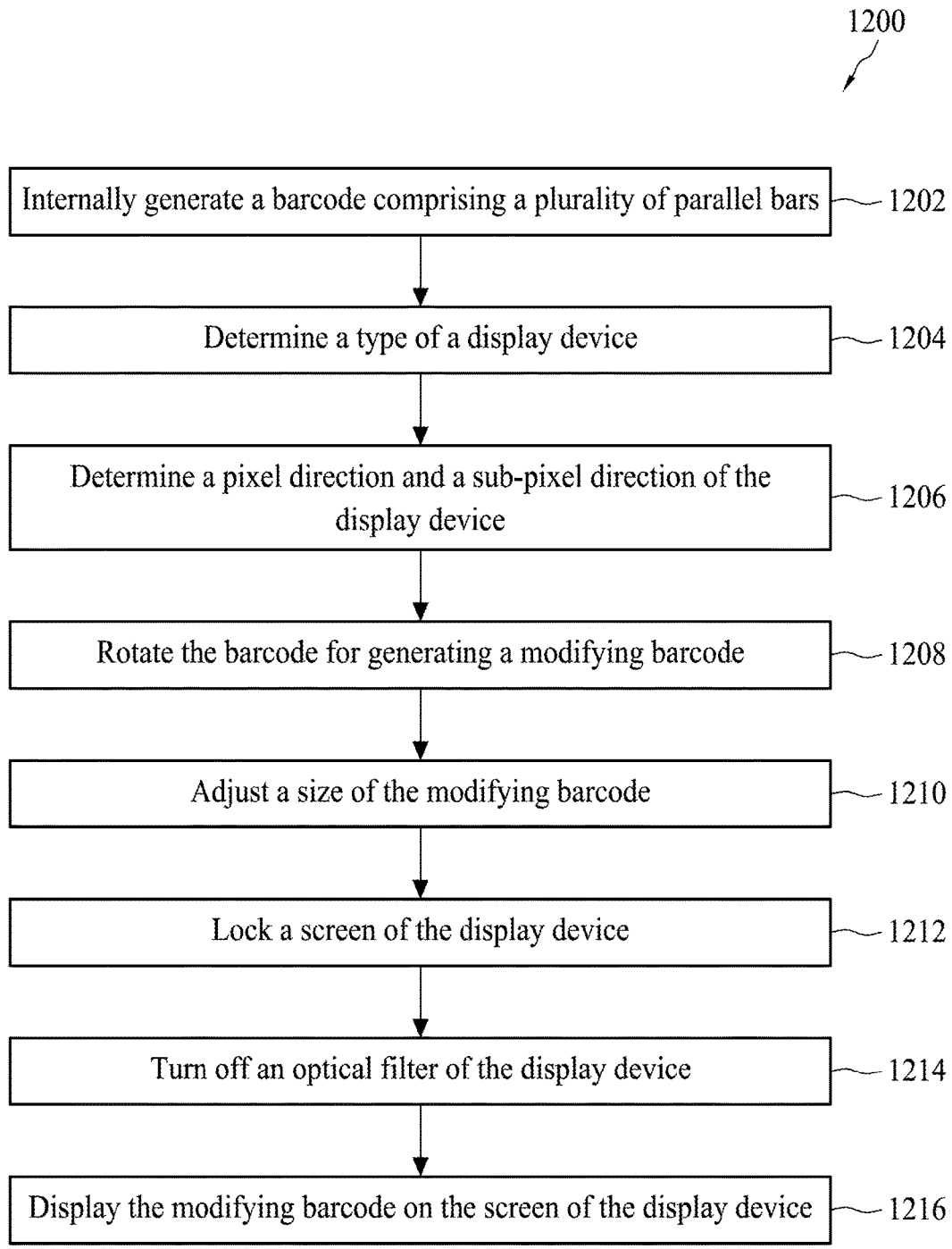
FIG. 12 is a flow diagram illustrating a barcode displaying method of a display device in accordance with a fourth embodiment of the present disclosure.

Furthermore, in another embodiment, the display device 200 may internally generate the barcode Sb instead of receiving the barcode Sb from an external system via the receiving unit 202. For example, the barcode Sb may be dynamically generated by a local software program or a mobile APP in the display device 200. The barcode Sb may also be stored in a storage device of the display device 200, and the display device 200 may just read out the barcode Sb from the storage device. When the barcode Sb is generated in the display device 200, the processor 204 of the display device 200 performs the modification upon the barcode Sb to generate the modifying barcode Sba. Then, the display device 200 displays the modifying barcode Sba on the screen 206. FIG. 12 is a flow diagram illustrating a barcode displaying method 1200 of a display device in accordance with a fourth embodiment of the present disclosure. Provided that substantially the same result is achieved, the steps of the flow diagram shown in FIG. 12 do not need to be in the exact order shown and do not need to be contiguous, that is, other steps can be intermediate. The barcode displaying method 1200 comprises:

Step 1202: Internally generate the barcode Sb comprising the plurality of parallel bars;

Step 1204: Determining a type of the display device 200;

Step 1206: Determining a pixel direction and a sub-pixel direction of the display device 200;

Step 1208: Rotating the barcode Sb for generating the modifying barcode Sba such that the plurality of modifying parallel bars 401_1-401_x of the modifying barcode Sba are perpendicular or substantially perpendicular to the pixel direction;

Step 1210: Adjusting a size of the modifying barcode Sba such that a Moire fringe period caused by the modifying barcode Sba and the screen 206 of the display device 200 is larger than the threshold period Tp;

Step 1212: Locking the screen 206 of the display device 200 such that the modifying barcode Sba displayed on the screen 206 does not move according to a movement of the display device 200;

Step 1214: Turning off the optical filter 212 of the display device 200 such that the modifying barcode Sba displayed on the screen 206 does not undergo the pixel rendering process;

Step 1216: Displaying the modifying barcode Sba on the screen 206 of the display device 200.

In comparison to the embodiment of barcode displaying method 900 in FIG. 9, the barcode Sb of the barcode displaying method 1200 is generated in the display device 200 (i.e. step 1202) while the barcode Sb of the barcode displaying method 900 is received from a device external to the display device 200 (i.e. step 902). The operation of steps 1204-1216 is similar to the operation of steps 904-916, thus the detailed description is omitted here for brevity.

According to the present disclosure, the barcode displaying method 900 can also be implemented by program instructions. The program instructions are stored in a non-transitory computer readable recording medium such as one or more optical disks, hard disks and non-volatile memory devices. Therefore, in another embodiment of the present disclosure, a non-transitory computer-readable storage medium storing the program instructions is provided. When the program instructions are executed by a computer, the computer may perform the barcode displaying method 900 for displaying a modifying barcode on a screen of a display device. One with ordinary skill in the art will appreciate to understand the operation of the computer after reading the operation of the above display device 200, thus the detailed description of the computer is omitted here for brevity.

It should be noted that, in the above embodiment, the display device 200 receives the non-processed barcode Sb and then processes the barcode Sb to generate the modifying barcode Sba. Therefore, the display device 200 can be regarded as a post-processed system that processes the barcode Sb to generate the modifying barcode Sba in the device.

In another embodiment of the present disclosure, a display device may receive the processed barcode (i.e. the modifying barcode Sba) or the partially processed barcode from an external system (e.g. a network server or an e-payment system) of the display device so that the display device can directly display the modifying barcode Sba on the screen. The modifying barcode Sba is pre-processed in the external system, such as an Internet. The external system may apply the similar operation performed in the display device 200 to process the non-processed barcode Sb to generate the modifying barcode Sba. The modifying barcode Sba is transmitted to the display device for displaying. The display device may be activated automatically or manually (e.g. touching the icon or button of the display device, and/or activating via the bio authentication process). The external system may perform a HANDSHAKING process with the display device to identify the information of display type, screen size, pixel layout, Moire fringe issue, and so on. Accordingly, the display device may be regarded as a pre-processed system, and the display device also belongs to the scope of the present disclosure.

According to an embodiment of the present invention, a barcode displaying method of a display device is disclosed. The barcode displaying method comprises: determining a pixel direction and a sub-pixel direction of the display device, wherein the pixel direction is different from the sub-pixel direction; generating a modifying barcode such that a plurality of modifying parallel bars of the modifying barcode are perpendicular or substantially perpendicular to the pixel direction; and displaying the modifying barcode on a screen of the display device.

According to an embodiment of the present invention, the barcode displaying method further comprises: adjusting a size of the modifying barcode such that a Moire fringe period caused by at least one of the modifying barcode, a barcode reader, and the screen of the display device is larger than a threshold period.

According to an embodiment of the present invention, the step of adjusting the size of the modifying barcode comprises: adjusting widths of the plurality of modifying parallel bars and spaces of the plurality of modifying parallel bars such that a width of the smallest modifying parallel bar in the plurality of modifying parallel bars falls within a predetermined range.

According to an embodiment of the present invention, the step of adjusting the size of the modifying barcode comprises: adjusting widths of the plurality of modifying parallel bars and spaces of the plurality of modifying parallel bars such that a width of the smallest space in the spaces of the plurality of modifying parallel bars falls within a predetermined range.

According to an embodiment of the present invention, the barcode displaying method further comprises: locking the screen of the display device such that the modifying barcode displayed on the screen does not move according to a movement of the display device.

According to an embodiment of the present invention, the barcode displaying method further comprises: controlling the display device to not respond to a motion sensor of the display device such that the modifying barcode displayed on the screen does not move according to a movement of the display device.

According to an embodiment of the present invention, the barcode displaying method further comprises: turning off an optical filter of the display device such that the modifying barcode displayed on the screen does not undergo a pixel rendering process.

According to an embodiment of the present invention, the step of determining the pixel direction and the sub-pixel direction of the display device comprises: determining a type of the display device; and determining the pixel direction to be a vertical direction on the screen and the sub-pixel direction to be a horizontal direction on the screen if the type of the display device is a liquid crystal display (LCD).

According to an embodiment of the present invention, the step of determining the pixel direction and the sub-pixel direction of the display device comprises: determining a type of the display device; and determining the pixel direction to be a first diagonal direction on the screen and the sub-pixel direction to be a second diagonal direction on the screen if the type of the display device is an active-matrix organic light-emitting diode (AMOLED) display, wherein the first diagonal direction is different from the second diagonal direction.

According to an embodiment of the present invention, the step of generating the modifying barcode comprises: rotating a barcode having a plurality of parallel bars for generating the modifying barcode such that the plurality of modifying parallel bars of the modifying barcode are substantially perpendicular to the pixel direction; wherein the barcode is generated in the display device or received from a processor external to the display device.

According to an embodiment of the present invention, the step of rotating the barcode for generating the modifying barcode comprises: rotating the barcode at an angle of 90 degrees for generating the modifying barcode if the display device is a liquid crystal display (LCD).

According to an embodiment of the present invention, the step of rotating the barcode for generating the modifying barcode comprises: rotating the barcode at an angle of 45 degrees for generating the modifying barcode if the display device is an active-matrix organic light-emitting diode (AMOLED) display.

According to an embodiment of the present invention, the barcode displaying method further comprises: performing an authentication process to obtain an authentication result; and the step of displaying the modifying barcode on the screen of the display device comprises: displaying the modifying barcode on the screen of the display device if the authentication result indicates the display device passing the authentication process.

According to an embodiment of the present invention, the step of performing the authentication process to obtain the authentication result comprises: performing a password authentication process, a symbol authentication process, an iris authentication process, a finger vein authentication process, or a finger print authentication process to obtain the authentication result.

According to another embodiment of the present invention, a non-transitory computer-readable storage medium storing program instructions that when executed by a computer cause the computer to perform a barcode displaying method for displaying a modifying barcode on a screen of a display device is disclosed. The barcode displaying method comprises: determining a pixel direction and a sub-pixel direction of the display device, wherein the pixel direction is different from the sub-pixel direction; generating a modifying barcode such that a plurality of modifying parallel bars of the modifying barcode are perpendicular or substantially perpendicular to the pixel direction; and displaying the modifying barcode on a screen of the display device.

In light of the above embodiments of the present disclosure, after a barcode is rotated and re-scaled, a barcode scanner can directly read the modifying barcode on the screen. Moreover, by locking the screen, the orientation and size of the modifying barcode is fixed on the screen. Then, a user can randomly move the display device to the barcode scanner for scanning the modifying barcode. Therefore, the present disclosure provides a very convenient way to display a barcode on an electronic device such that a barcode scanner can directly read the barcode on the screen.

Although the technical content and technical features of the present disclosure are discloses in the above descriptions, one with ordinary skill in the art would understand substitutions and modifications may be made without departing from the spirit and scope of claims of the present disclosure. For example, many of the above disclosed processing procedures can be substituted by different implementations, other procedures or a combination of any two of the above disclosed processing procedures.

Additionally, the scope of claims of the present application is not limited to the procedures, machines, manufacture, components of matters, devices, methods or steps disclosed in the above embodiments. One with ordinary knowledge in the art of the present disclosure would understand that based on the present disclosure, the current or future developed procedures, machines, manufacture, components of matters, devices, methods or steps, which implement substantially the same functions and achieve substantially the same effects as those of the present disclosure, can be used in the present disclosure. Hence, these procedures, machines, manufacture, components of matters, devices, methods and steps fall within the scope of the following claims.

What is claimed is:

1. A display device, comprising: a screen, arranged to display a modifying barcode having a plurality of modifying parallel bars;
   wherein the screen has a pixel direction and a sub-pixel direction different from the pixel direction, and the plurality of modifying parallel bars of the modifying barcode are perpendicular to the pixel direction,
   wherein pixels of the display device in the same column are arranged in the pixel direction, and subpixels of the pixels in the same row are arranged in the sub-pixel direction.

2. The display device of claim 1, further comprising:
   a processor, arranged to determine the pixel direction and the sub-pixel direction of the screen, and to generates the modifying barcode such that the plurality of modifying parallel bars of the modifying barcode are perpendicular to the pixel direction.

3. The display device of claim 2, wherein the processor further adjusts a size of the modifying barcode such that a Moire fringe period caused by at least one of the modifying barcode, a barcode reader, and the screen is larger than a threshold period.

4. The display device of claim 3, wherein the processor adjusts widths of the plurality of modifying parallel bars and spaces of the plurality of modifying parallel bars such that a width of the smallest modifying parallel bar in the plurality of modifying parallel bars falls within a predetermined range.

5. The display device of claim 3, wherein the processor adjusts widths of the plurality of modifying parallel bars and spaces of the plurality of modifying parallel bars such that a width of the smallest space in the spaces of the plurality of modifying parallel bars falls within a predetermined range.

6. The display device of claim 2, wherein the processor further determines a type of the display device; if the type of the display device is a liquid crystal display (LCD), the processor determines the pixel direction is a vertical direction on the screen, and the sub-pixel direction is a horizontal direction on the screen.

7. The display device of claim 2, wherein the processor further determines a type of the display device; if the type of the display device is an active-matrix organic light-emitting diode (AMOLED) display, the processor determines the pixel direction is a first diagonal direction on the screen and the sub-pixel direction is a second diagonal direction on the screen, and the first diagonal direction is different from the second diagonal direction.

8. The display device of claim 2, further comprising:
   a receiving unit, arranged to receive a barcode comprising a plurality of parallel bars;
   wherein the processor rotates the barcode for generating the modifying barcode such that the plurality of modifying parallel bars of the modifying barcode are perpendicular to the pixel direction.

9. The display device of claim 8, wherein the processor rotates the barcode at an angle of 90 degrees for generating the modifying barcode if the display device is a liquid crystal display (LCD).

10. The display device of claim 8, wherein the processor rotates the barcode at an angle of 45 degrees for generating the modifying barcode if the display device is an active-matrix organic light-emitting diode (AMOLED) display.

11. The display device of claim 1, further comprising:
    a controller, arranged to lock the screen such that the modifying barcode displayed on the screen does not move according to a movement of the display device.

12. The display device of claim 1, further comprising:
    a motion sensor, arranged to sense a movement of the display device to generate a motion signal; and
    a controller, arranged to control the display device to not respond to the motion signal such that the modifying barcode displayed on the screen does not move according to the movement of the display device.

13. The display device of claim 1, further comprising:
    an optical filter, arranged to perform a pixel rendering process; and
    a controller, arranged to turn off the optical filter such that the modifying barcode displayed on the screen does not undergo the pixel rendering process.

14. The display device of claim 1, further comprising:
    a processor, arranged to perform an authentication process to obtain an authentication result, and the screen is arranged to display the modifying barcode if the authentication result indicates the authentication process is passed.

15. The display device of claim 14, wherein the authentication process comprises a password authentication process, a symbol authentication process, an iris authentication process, a finger vein authentication process, or a finger print authentication process.

16. The display device of claim 1, further comprising:
    a receiving unit, arranged to receive the modifying barcode;
    wherein the modifying barcode is pre-processed by a processor external to the display device according to a barcode such that the plurality of modifying parallel bars of the modifying barcode are perpendicular to the pixel direction.

17. The display device of claim 1, further comprising:
a receiving unit, arranged to receive a partially processed barcode; and
a first processor, arranged to process the partially processed barcode to generate the modifying barcode such that the plurality of modifying parallel bars of the modifying barcode are perpendicular to the pixel direction.

18. The display device of claim 17, wherein the partially processed barcode is pre-processed by a second processor external to the display device.

19. The display device of claim 17, wherein the partially processed barcode is pre-processed on an Internet external to the display device.

* * * * *